US005553252A

United States Patent [19]

Takayanagi et al.

[11] Patent Number: 5,553,252

[45] Date of Patent: Sep. 3, 1996

[54] DEVICE FOR CONTROLLING DATA TRANSFER BETWEEN CHIPS VIA A BUS

[75] Inventors: Kazunori Takayanagi, Sagamihara; Shinpei Watanabe, Yokohama, both of Japan

[73] Assignee: International Business Machines Corporation, Armonk, N.Y.

[21] Appl. No.: 284,873

[22] Filed: Aug. 2, 1994

[30] Foreign Application Priority Data

Aug. 11, 1993 [JP] Japan .................................... 5-199550

[51] Int. Cl.$^{6}$ .................................................... G06K 19/06

[52] U.S. Cl. ........................... 395/310; 395/831; 395/375

[58] Field of Search .................................... 395/307, 308, 395/375, 831, 310; 364/232.22, 260, 260.1, 260.2, 260.3

[56] References Cited

U.S. PATENT DOCUMENTS

| | | | |
|---|---|---|---|
| 4,079,452 | 3/1978 | Larson | 395/831 |
| 4,346,452 | 8/1982 | Groves | 395/831 |
| 4,398,245 | 8/1983 | Fujita | 395/421.04 |
| 4,459,666 | 7/1984 | Kruger | 395/375 |
| 4,642,789 | 2/1987 | Lavelle | 395/250 |
| 4,683,534 | 7/1987 | Tietsen et al. | 395/307 |
| 4,805,090 | 2/1989 | Coogan | 395/894 |
| 4,821,172 | 4/1989 | Kaneko et al. | 395/375 |
| 4,999,764 | 3/1991 | Hirokawa | 395/200.07 |
| 5,031,091 | 7/1991 | Wakatsuki et al. | 395/831 |
| 5,065,314 | 11/1991 | Maskovyak | 395/831 |
| 5,083,260 | 1/1992 | Tsuchiya | 395/293 |
| 5,150,465 | 9/1992 | Bush et al. | 395/831 |
| 5,222,218 | 6/1993 | Smith | 395/308 |
| 5,226,140 | 7/1993 | Yamamura | 395/425 |
| 5,280,598 | 1/1994 | Osaki et al. | 395/425 |
| 5,293,167 | 3/1994 | Campbell, Jr. et al. | 341/141 |
| 5,369,744 | 11/1994 | Fukushima et al. | 395/162 |
| 5,388,227 | 2/1995 | McFarland | 395/307 |
| 5,394,528 | 2/1995 | Kobayashi et al. | 395/307 |
| 5,404,463 | 8/1995 | McGarvey | 395/308 |
| 5,420,412 | 5/1995 | Kowalski | 395/831 |

*Primary Examiner*—Jack B. Harvey
*Assistant Examiner*—Paul R. Myers
*Attorney, Agent, or Firm*—Mark E. McBurney; Volel Emile

[57] ABSTRACT

A draw control chip and video chips V1–V4 are provided. They are connected by a 64-bit data bus, a 4-bit program signal line, and a 1-bit ready signal line. The video chip V1 comprises a decoder DEC1, a program buffer address register PBAR, a sequencer SEQ, a program buffer PB, a decoder DEC2, an address control unit, a selector SEL, and various registers. The video chip V1 and the video buffer APA1 are connected by the data bus. This system is used to transfer data from the control chip to the various video chips in a single operation. The 64-bit data bus can be divided into smaller sections allowing smaller segments of data to be simultaneously processed by the video chips. Additionally, the video chips are capable of providing data directly to one another without accessing the control chip.

19 Claims, 8 Drawing Sheets

DEVICE FOR CONTROLLING DATA TRANSFER BETWEEN CHIPS VIA A BUS

BACKGROUND OF THE INVENTION

This invention relates to a device for controlling data transfer between integrated circuit chips via a bus, and more particularly to a data transfer controlling device for improving the efficiency of data transfer between bus-coupled chips.

Personal computers and workstations have recently been provided with a display device which can simultaneously display multiple colors at a high resolution. Such a display device can provide representation of a structure of CAD and computer graphics in full color.

Such a display device generally has an all point addressable (APA) video buffer, and a function for rewriting the content of display by writing data as pixel values in this APA video buffer.

Typically, pixel operations for display include BITBLT (moving pixel values in a specific area to another area) as well as operations on a pixel basis (for example, changing color values).

In general, methods for assigning a color code to each pixel typically include the following two methods. The first method is to assign, for example, bits at coordinates (X, Y) on each plane of an image memory to corresponding pixels at coordinates (X, Y) of a screen over multiple planes of the image memory. According to this method, assuming that the data constituting one pixel consists of eight bits, with eight memory planes being prepared. Each plane is separately associated with a video processing unit (device) for processing bit data. That is, the first method is just arranged so that one pixel passes through eight planes (plane method).

Although the second method is similar to the first method in that a plurality of memory planes are prepared, each of which is separately coupled to a video processing unit, eight-bit data constituting one pixel resides on a memory plane directly coupled to the video processing unit (packed color method).

In accordance with the first method, the BITBLT can complete the operation in individual memory planes only, and does not require data transfer over different video chips through the bus, allowing high speed processing. However, if it is intended to perform processing for pixel values, independent processing is not sufficient any longer, and data processing becomes necessary so that the bit values are sent to a separate processing unit from each memory plane through the bus by operating the individual video chips. The bytes collected here are subject to predetermined processing, and the bit values are again allocated through the reversed path, thus significantly lowering the processing speed.

In accordance with the second method, because the color value of one pixel resides in the same memory plane, processing of the pixel value can be completed only in a single video chip, allowing high speed processing. However, to perform the BITBLT operation, it is necessary to transfer 8-bit pixel values between different video processing units. Usually, the data bus of a workstation has a width of as much as 64 bits. However, when it is intended by using such 64-bit width bus to transfer 8-bit data between chips, the data bit width for one cycle of data transfer is fixed for a conventional bus. Therefore, when data smaller than the bus width is intended to be transferred, the bus width cannot be effectively used.

In addition, there are known the following publications or prior art which relate to data transfer through a bus.

Published Unexamined Patent Application (PUPA) No. 63-27891 discloses a technique in which parameters such as a top write address or a page width are prepared in advance by software, and stored in a predetermined hold circuit, and that subsequent write addresses are automatically generated by hardware.

PUPA No. 1-14656 discloses a technique in which a transfer address is provided to the first memory and read to be temporarily held in a temporary hold register, and the data held in the temporary hold register is written in the second memory by providing a destination address to the second memory so that a large amount of data can be transferred at high speed.

PUPA No. 1-280796 discloses the arrangement of a plurality of extended registers so as to share an extended bit map memory, and to operate shift registers at different speeds.

PUPA No. 2-284253 discloses the provision of a control section between a high speed bus and a low speed bus which performs data transfer between a main memory and a plurality of I/0 memories. In the case of, for example, data transfer from the main memory of 32-bit width to an I/O memory of 16-bit width, this control section reads 4-byte data from the source address of the main memory, takes it once into a data register in a data transfer device, and releases the bus.

PUPA No. 3-204756 discloses the provision of an inter-bus data transfer device having a data register and an address register.

PUPA No. 3-259340 discloses the enabling of it to transfer a large amount of data at high speed by simultaneously taking in a plurality of instructions, by reading and temporarily storing them in a temporary hold register, and by providing a destination address to a second memory to write the data temporarily stored in the temporary hold register in the second memory.

PUPA No. 4-252386 discloses the increasing of the speed of transferring data between devices by constituting with bus lines in a number larger than those of bits constituting one pixel without increasing the clock rate, and by transferring data of one or more pixels in one clock.

PUPA No. 4-265038 discloses making memory length variable in integer multiplication when the bit length of input data varies by providing a write address counter which carries a write clock in synchronization with the input data every time each internal memory counts the number of bits to be stored, and just counts the number of memories to generate write addresses and write control signals.

However, the technique recited in any of the above prior art has a problem in that data cannot be efficiently transferred on a bus with a predetermined bit width by a variable bus protocol.

SUMMARY OF THE INVENTION

An object of this invention is to improve data transfer efficiency by making a bus transfer protocol programmable.

Another object of this invention is to improve the data transfer efficiency by allowing, with a programmed operation, the placement of a plurality of data with different addresses on a bus with predetermined bit width in one cycle in a bit value smaller than that bit width.

To attain the above object, the device for controlling data transfer between chips via a bus comprises a first chip, a plurality of second chips, a data bus of a width of a plurality of bits which connects said first chip and said plurality of second chips such that transfer of data is possible, a signal line connecting said first chip and said plurality of second chips such that transfer of signals of predetermined bit values is possible, a plurality of registers are provided, respectively, on said plurality of second chips, each of said registers storing a code which controls the data transfer operation of said data bus, a selecting means for selecting one of said registers based on a bit value of a signal transferred by said signal line, and a control means for controlling the data transfer operation of said data bus based on said code stored in said register selected by said selector means.

The device for controlling data transfer between chips via a bus comprises a first chip, a plurality of second chips, a data bus of a width of a plurality of bits which connects the first chip and the plurality of second chips such that transfer of data is possible, a signal line connecting the first chip and the plurality of second chips such that transfer of signals of predetermined bit values is possible, a plurality of first registers provided respectively on the plurality of second chips, each of the first registers storing a code which controls a data transfer operation of the data bus, a plurality of second registers provided respectively on the plurality of second chips, each of the second registers being address assigned based on the bit width of signals transferred by the signal line, and storing data addressable to each of the first registers, and a control means for controlling the data transfer operation of the data bus based on the code stored in the first register addressed by addressable data stored in the second register.

The device for controlling data transfer between chips via a bus further comprises a means for sequentially accessing said plurality of registers according to the address such that the plurality of registers are made separately addressable, and the code is allowed to be sequentially decoded.

The device for controlling data transfer between chips via a bus comprises a first chip, a plurality of second chips, a data bus of a plurality of bit widths which connects the first chip and the plurality of second chips such that the transfer of data between the first chip and the plurality of second chips is possible, a signal line connecting the first chips and the plurality of second chips such that transfer between said first chip and said plurality of second chips of signals of predetermined bit values is possible, a plurality of registers provided respectively on the plurality of second chips, each of the registers storing a code which controls a data transfer operation of the data bus, a selecting means for selecting one of the registers based on a bit value of signal transferred by the signal line, and a control means for controlling the data transfer operation between the plurality of second chips based on the code stored in the register selected by the selecting means and also for controlling the transfer between the first chip and the second chips.

The device for controlling data transfer between chips via bus comprises a first chip, a plurality of second chips, a data bus of a plurality of bit widths which connects the first chip and the plurality of second chips such that transfer of data between the first chip and the plurality of second chips is possible, a signal line connecting the first chips and the plurality of second chips such that transfer between the first chip and the plurality of second chips of signals of predetermined bit values is possible, a plurality of registers provided respectively on the plurality of second chips, each of the registers storing a code which controls a data transfer operation of the data bus, a selecting means for selecting one of the registers based on a bit value of a signal transferred by the signal line, and a controlling means for controlling the second chips based on the codes for controlling the data transfer operation stored in the register selected by the selecting means such that a predetermined second chip can transmit and receive data of predetermined bit of the data transmitted through the data bus.

The device for controlling data transfer between chips via a bus comprises a first chip, a plurality of second chips, a data bus of a plurality of bit widths which connects the first chip and the plurality of second chips such that transfer of data between the first chip and the plurality of second chips is possible, a signal line connecting the first chips and the plurality of second chips such that transfer between the first chip and the plurality of second chips of signals of predetermined bit values is possible, a plurality of registers provided respectively at the plurality of second chips, each of the registers storing a code which controls a data transfer operation of the data bus, a selecting means for selecting one of the registers based on a bit value of a signal transferred by the signal line, and a control means for controlling the data transfer operation of the data bus by repeating for a predetermined number of times processing based on the code stored in the register selected by the selecting means.

The device for controlling data transfer between chips via a bus as discussed above, wherein each of the plurality of second chips is a video chip performing write or read processing in or from a video buffer for holding pixel draw data.

The device for controlling data transfer between chips via a bus, wherein the video buffer for holding the pixel drawing data holds data for drawing one pixel in a memory connected in series by the video processing unit.

The present invention transfers data by the data bus of a width of a plurality of bits connected between the first chip and the plurality of second chips. The selecting means selects one of the plurality of registers which are provided respectively on the plurality of second chips, and each of which can store a code describing a data transfer operation of the bus. The controlling means controls the data transfer operation of the data bus based on the code stored in the register selected by the selecting means.

Thus, it is possible to control the data transfer operation of the data bus by selecting one of a plurality of codes, each of which describes a bus control operation with the bit value of a signal transferred by the signal line and the register selected by that bit value.

The present invention also makes the first registers addressable with the plurality of second registers which are respectively provided on the plurality of second chips. The controlling means selects a predetermined second register by a bit value transferred over the signal line so as to control the data transfer operation of the data bus based on the control operation code stored in the first register addressed by the selected second register.

Therefore, various first registers can be addressed by indirectly addressing the first register with the second register.

The present invention also provides that the plurality of registers are individually addressable, and the sequential access means sequentially decodes the codes stored in the plurality of registers.

Accordingly, as the codes stored in the registers are sequentially decoded, a series of necessary operations can be sequentially executed.

The present invention further includes controlling means which control the data transfer operation between the plurality of second chips based on the control operation code stored in the first register selected by the selecting means.

Accordingly, as the data is transferred in accordance with the previously stored control operation, there is no need to send complicated control data during the data transfer so that the data transfer efficiency can be increased.

Further, the controlling means divides the bit width of the data bus by receiving with the second chips data of predetermined bits of those transferred through the data bus.

Accordingly, a predetermined second chip processes data in parallel with other second chips by transmitting and receiving data of predetermined bits of those transferred through the data bus so that the transfer efficiency can be improved.

The controlling means of the present invention also controls the data transfer operation of the data bus by repeating processing for a predetermined number of times based on the control operation codes stored in the program register selected by the selecting means.

As the data transfer operation of the data bus is controlled by repeating processing for a predetermined number of times, it is easy to save the number of program registers which store the control operation codes, and to perform programming of the codes for the control operation.

Additionally, each other one of the plurality of chips is a video chip for performing writing or reading operation to or from a video buffer for holding pixel draw data.

Furthermore, the present invention includes a video buffer for holding the pixel draw data is implemented in a packed color method which holds one pixel on the same plane (in the following description, a memory directly connected to a video processing unit being called as a "plane").

In accordance with the above, data transfer efficiency is improved by making a bus transfer protocol programmable and by providing on a bus of a predetermined bit width a plurality of data with a bit value smaller that the bit width in one cycle under a programmed operation.

Therefore, in accordance with the previous summary, objects, features and advantages of the present invention will become apparent to one skilled in the art from the subsequent description and the appended claims taken in conjunction with the accompanying drawings.

DESCRIPTION OF THE PREFERRED EMBODIMENTS

Figure 1:
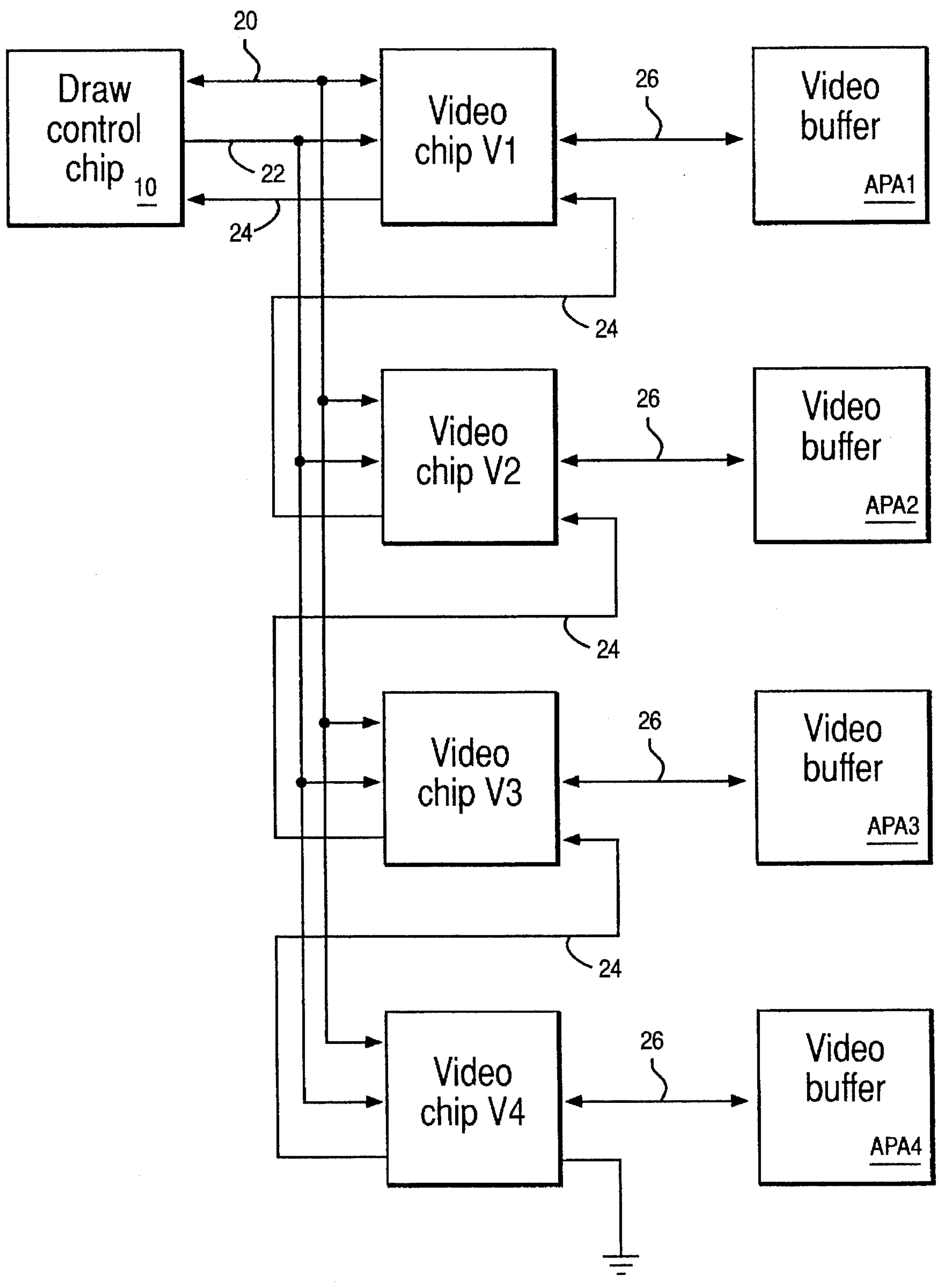
FIG. 1 is a diagram showing an entire overview of an embodiment of the present invention.

A preferred embodiment of this invention will be hereinafter described in detail by referring to the drawings. As shown in FIG. 1, the device for controlling data transfer between chips via a bus according to this embodiment comprises a draw control chip 10, and four video chips V1–V4. The draw control chip 10 performs control according to instructions input from a CPU and an input device, both not shown, to write pixel draw data in each of video buffers APA1–APA4, or to read pixel draw data stored in the video buffers APA1–APA4 for display on a graphic display, not shown. Each of video chips V1–V4 reads predetermined two-dimensional pixel draw data from the video buffers APA1 APA4 based on a request from the draw control chip 10, performs operations on the pixel draw data, and performs write/read processing in and from the video buffers APA1–APA4. The buffers APA1–APA4 consist of RAMs for storing the pixel draw data.

The draw control chips 10 and the video chips V1–V4 are connected by a data bus 20, which allows 64-bit bidirectional data transfer, and a 4-bit program signal line 22 transferring signals transferred from the draw control chip 10 for controlling the access method or the like in data transfer by the data bus 20.

In addition, the draw control chip 10 and the video chip V1 are connected to a one-bit ready signal line 24 which transfers an authorization signal for data transfer from the video chip V1 to the draw control chip through the data bus when the processing is completed in the video chips V1–V4. The video chips V1–V4 are also interconnected by the one-bit ready signal line Each of the video chips V1–V4 is connected to predetermined one of the video buffers APA1–APA4 through a data bus 26 so as to constitute the individual memory planes by the packed color method.

Next, the configuration of the video chips V1–V4 is described. Because the video chips V1–V4 have the same configuration, only the configuration of video chip V1 is described and that for the video chips V2–V4 is omitted.

Figure 2:
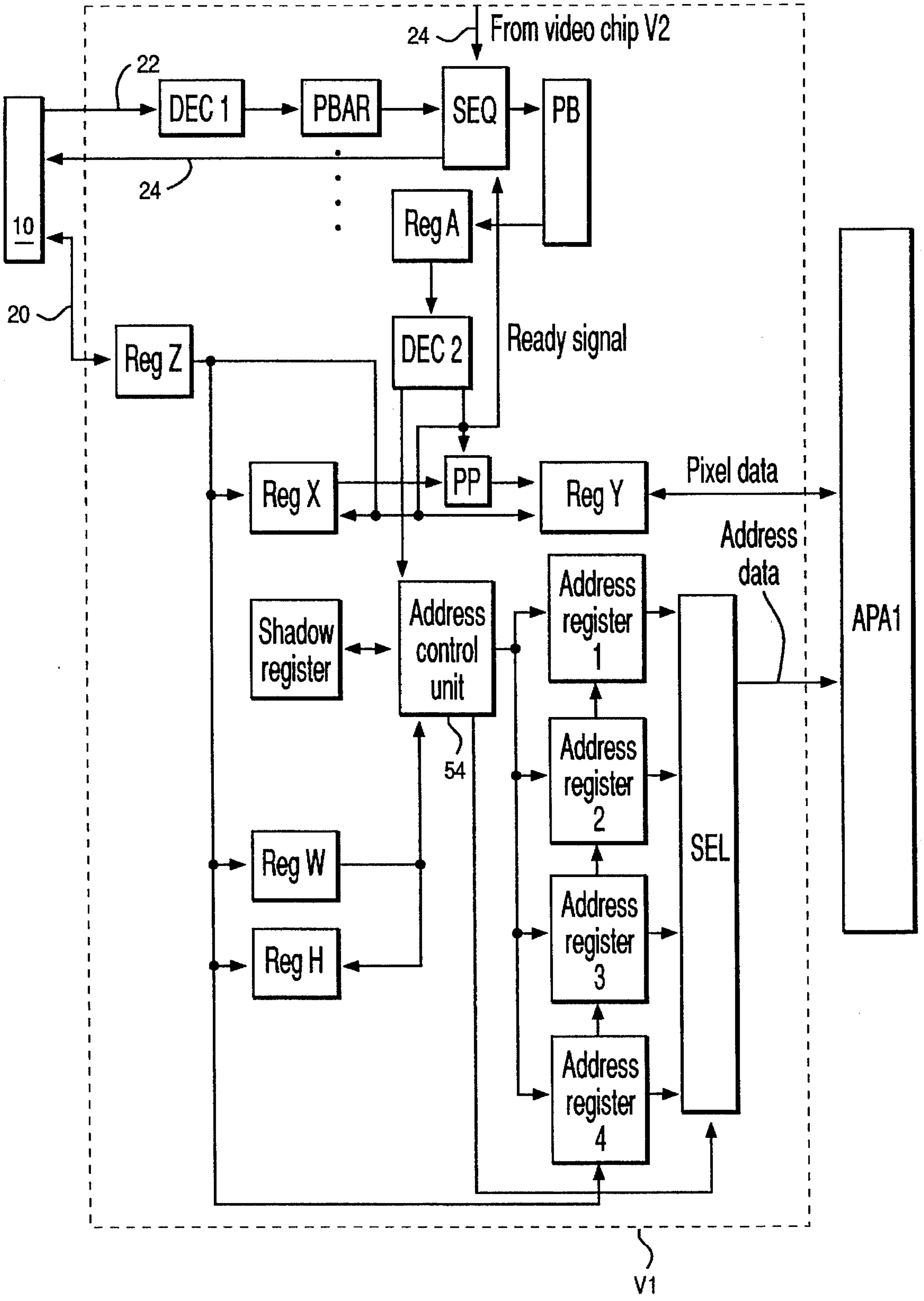
FIG. 2 is a configuration of a video chip V1.

As shown in FIG. 2, the program signal line 22 connects to a decoder DEC1 of the video chip V1. The decoder DEC1 selects one of a plurality of program buffer address registers PBARs. The program buffer address register PBAR connects to a sequencer SEQ. The sequencer SEQ addresses a program buffer PB in accordance with an address value stored in the selected program buffer address register PBAR and orders execution following the program buffer PB.

A register RegA serves as a latch temporarily holding an instruction read from the addressed program buffer PB.

A decoder DEC2 decodes the instruction stored in the register RegA, and enables various registers, for example, registers RegX and RegY, based on the decoded content so as to cause them to perform transfer between them, and causes an address control unit 54 to perform processing. For example, the processing by the decoder DEC2 includes reading of data from the data bus 20 to the register RegX, data transfer between the registers RegX and RegY, exchange of data between the register RegX and the video buffer APA1, and causing the address control unit 54 to increment an address.

A pixel processor PP has a predetermined register, although not shown. The content of the above operation is previously loaded in this register from the draw control chip 10. The pixel processor PP is also connected to DEC2 and SEQ. The pixel processor PP has a function to cause SEQ to hold transfer to the next program buffer when its pixel processing does not complete in one cycle, but takes time. DEC2 instructs arrival of pixel data to the pixel processor PP in accordance with its decoding processing.

The register RegY is a register for inputting and outputting the pixel draw data to and from the pixel buffer APA1, and inputs and outputs the pixel draw data to and from the video buffer APA1 connected to each video chip V1, as described later.

A register RegZ is a register for transferring data through the data bus 20, while the register RegX is a register for transferring data between the video chips V1–V4, or storing data from the draw control chip 10 by dividing it into, for example, four. The register RegX connects to the 64-bit register RegZ connected to the data bus 20 and is for transmitting and receiving data.

The address control unit 54 controls an address register in which the address of pixel draw data in the video buffer APA1 is stored when the register RegY reads or writes data from and in the video buffer APA1. The address register 1 stores an address of pixel draw data in the video buffer APA1 for reading the pixel draw data from the video buffer APA1, and the address register 2 stores an address of pixel draw data in the video buffer APA1 for writing the pixel draw data in the video buffer APA1. For example, in the BITBLT operation, the address register 1 stores the address of the pixel draw data for source, and the address register 2 stores the address of the pixel draw data for destination.

In addition, the control from the address control unit 54 also serves to increment or decrement the values stored in the address registers 1 and 2, and once holds the values stored in the address registers 1 and 2 in a shadow register to return the values stored in the address registers 1 and 2 to the previous ones, if necessary, after incrementing the address registers 1 and 2. A selector SEL selects which of the address registers 1–4 is output as the address of APA1 under the control of the address control unit 54.

Registers RegW and RegH are registers for storing the width and the height of a rectangle for performing the BITBLT operation.

The program buffer address register PBAR has, for example, a 16-bit configuration, and stores addresses to separately address a plurality of program buffers PBs. Each program buffer also has a 16-bit configuration and stores instructions for controlling the data bus 20 or the protocol.

Next, the plane arrangement of video buffers APA1–APA4 of this embodiment is described. Although this embodiment handles draw data of 8 bits per pixel, this invention is not limited to this particular data bits but can be applied to a case where draw data of 16, 4, or 2 bits per pixel, etc., is handled.

The draw data for pixels existing on each plane are determined by X- and Y-addresses of the pixel draw data. An example of it is described in the following.

In the case of draw data, the number of bits per pixel of which is eight bits, the video buffers APA1–APA4 and the video chips V1–V4 connected to the plane containing the pixels are configured as follows. When the Y-address of the pixel draw data is zero, the video chip V1 connects the X-addresses 00 and 02 of the pixel draw data, the video chip V2 connects its X-addresses 01 and 03, the video chip V3 connects its X-addresses 04 and 06, and the video chip V4 connects its X-addresses 05 and 07 so that only one of the video chips V1–V4 connected to this pixel becomes accessible. Similarly, for the X- and Y-addresses of other pixel draw data, on which plane this pixel draw data exists is determined by the X- and Y-address of the pixel draw data, and only one of the video chips V1–V4 connected to the plane becomes accessible. In this arrangement, there are two pixel processing units in one video chip. Also, one video chip is connected to two planes. However, this invention is not limited to such an arrangement, and it is obvious that it can be applied to an arrangement in which one video chip is connected to one plane.

Therefore, for example, if, in the BITBLT operation, described later, the pixel draw data is moved from the source to the destination, the video chips V1–V4 connected to the planes in the video buffers APA1–APA4 for the source pixel reads the pixel draw data at the source, and transfers to the video chips V1–V4 connected to the plane on which the pixel draw data for the destination exists through the data bus 20.

Furthermore, the video buffers APA1–APA4 store the pixel draw data of eight bits per pixel by the packed color method. Although this embodiment is described for the pixel draw data of eight bits per pixel as an example, the pixel draw data may be of 16, 4 or 2 bits per pixel.

The 4-bit program signal line 22 is for indicating the accessing method to the registers in the video chips V1–V4 and the type of data (address of a register or pixel draw data) transferred through the data bus 20.

The accessing methods to the registers in the video chips V1–V4 include a direct access and an indirect access. The direct access is to access a register or one of the video buffers APA1–APA4 pointed by the address data transferred through the data bus 20. The indirect access is to access a register pointed by an address stored in a register pointed by address data transmitted through the data bus 20.

Furthermore, direct access has a state (status) indicating the type of data transferred through the data bus 20, reading/writing from or to one of APA1–APA4 or a register, or either the address of the registers in the video chips V1–V4 or the address of the video buffers APA1–APA4, and a state indicating the address of register in the video chips V1–V4 specified by the former state, the address of the video buffers APA1–APA4, the value of register in the video chips V1–V4, or the pixel draw data. In the following, the former state in the direct access is called an order state, the latter a data state.

Therefore, when reading/writing of the register value and the draw data of pixels is performed to the predetermined register in the video chips V1–V4 and the predetermined video buffers APA1–APA2, the address of the registers in the video chips V1–V4 or the like is specified in the order state, and then the address value of the video chips V1–V4 or the like is specified in the data state.

For example, a value of the 4 bit program signal line 22 is expressed as follows:

0: Order state (direct mode)

1: Data state (direct mode)

2 - E: Indirect access (indirect mode)

This value of indirect access represents the ID of the program buffer address register PBAR indicating the address in the program buffer. For example, the value of indirect access of 2 indicates PBAR ID of 0, 3 indicates PBAR ID of 1, . . . , and E indicates PBAR ID of 12. The program buffer address register PBAR stores an address for pointing a program buffer PB in which a 16-bit wide program, for example, of 512 steps, described later, is stored. The program is executed by specifying the address of the program buffer PB with the indirect access.

Moreover, the program buffer is indirectly addressed by a bit value of signal transferred over the program signal line 22. 13 types of programming can be attained according to the bit values (2 - E) of the program signal line 22.

Furthermore, 13 or more programs can be selected by changing the contents of the program buffer address register PBAR from the draw control chip 10 in the data state.

An example of contents of data transferred from the draw control chip 10 to the video chips V1–V4 through the data bus 20 in the order state is described.

Figure 3:
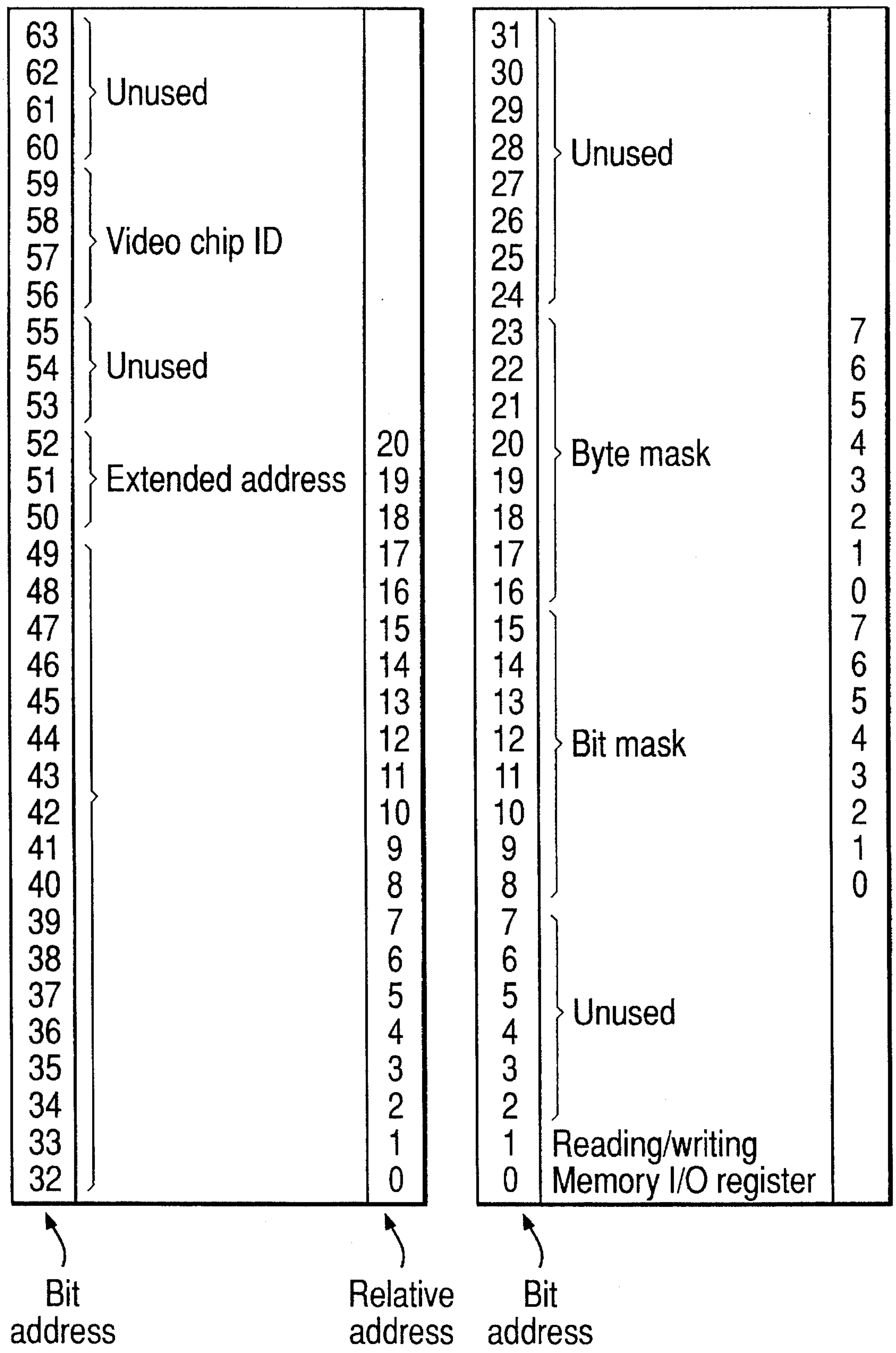
FIG. 3 is a diagram showing the contents of 6-bit data in the order state.

As shown in FIG 3, 0-th bit of the bit address indicates whether it is an access to the video buffers APA1–APA4 or to the registers provided on the video chips V1–V4. The first bit indicates whether read or write is performed when the video buffers APA1–APA4 or the registers provided on the video chips V1–V4 are accessed. That is, when write is specified, it indicates transfer of data from the draw control chip 10 to the video chips V1–V4, while, when read is specified, it indicates transfer of data from the video chips V1–V4 to the draw control chip 10.

56-th to 59-th bits are video IDs, and provide a video ID for each of the video chips V1–V4 enabling access for reading/writing to one of the video chips V1–V4 identified by the video ID.

Bits 32 to 49 are address bits, and indicate addressees of the video buffers APA1–APA4 or the registers in the video chips V1–V4 for performing reading/writing. When the addresses of the video buffers APA1–APA4 are specified, they indicate addresses in 64-bit unit, allowing accesses to the video buffers APA1–APA4 for every 64 bits. Each of the 8-bit pixel draw data in the 64 bits is carried by one of the video chips V1–V4 previously determined by an X-address and a scan line address of pixel draw data, described later, and processed in parallel.

Bits 50–52 indicate extended addresses, and are bits for expanding the address space in the video buffers APA1–APA4.

Eight bits from bit 16 to bit 23 indicate a byte mask, which divides 64-bit data into eight byte data, and instructs the eight byte divided data which of the data should be enabled. This is attained in such a manner that, for example, when the pixel draw data is written into the video buffers APA1–APA4, if there is no need to rewrite the pixel draw data at a predetermined address, the bit in the byte mask corresponding to the pixel draw data corresponding to this byte mask is disabled.

Eight bits from bit 8 to bit 15 indicate a bit mask, enable the 8-bit pixel draw data enabled by the byte mask on bit-by-bit basis.

The contents of the 16-bit programs stored in the program buffer PB are described. There are a program for instructing transfer of the pixel draw data or the like between the registers in the video chips V1–V4, or between the draw control chip 10 and the video chips V1–V4, and one for instructing a protocol between the draw control chip 10 and the video chips V1–V4 for reading or writing the values of the register in the video chip transferred by the draw control chip 10.

Figure 4:
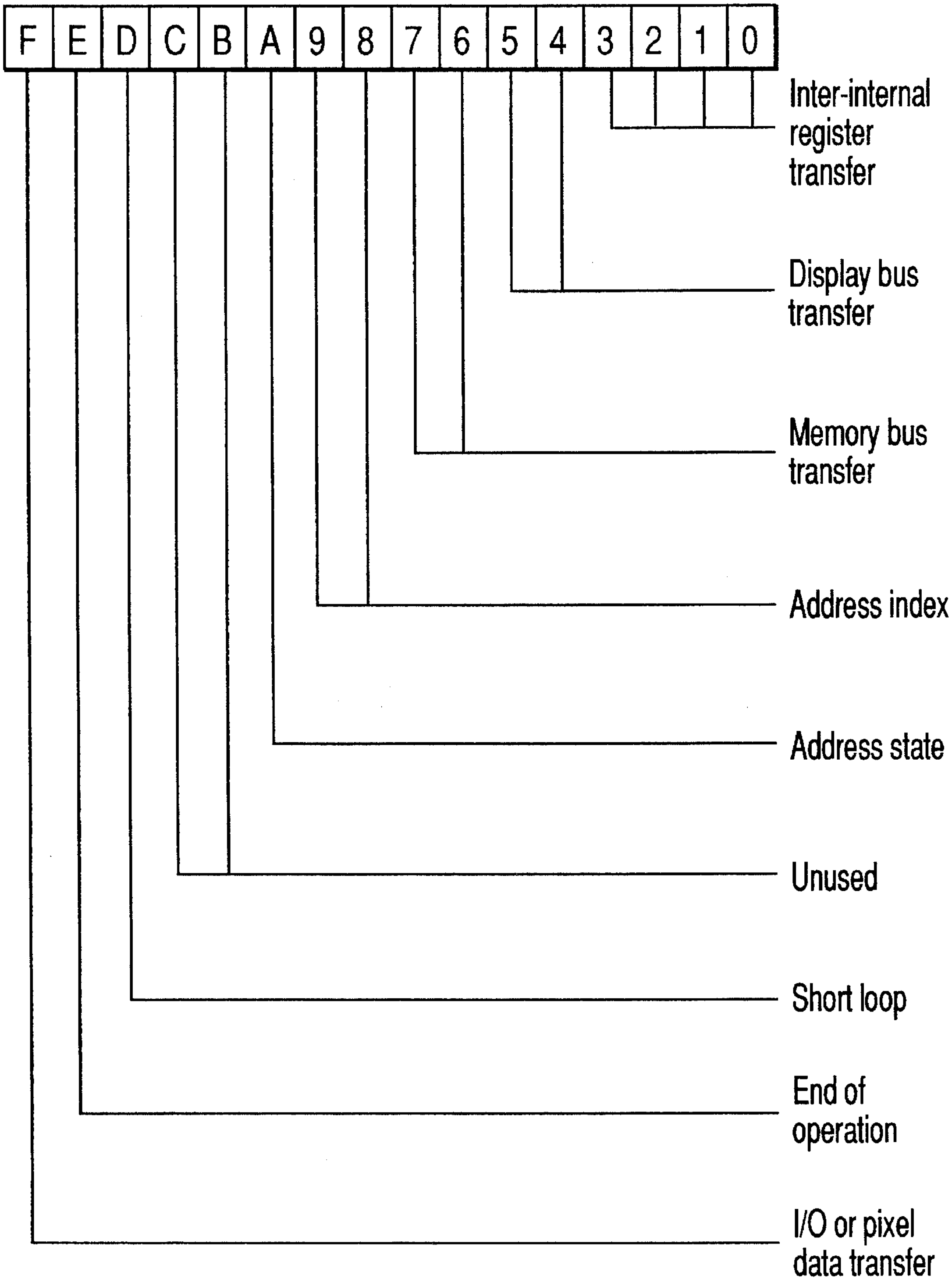
FIG 4 is a diagram showing an example of contents of a program in transferring pixel data.

FIG. 4 shows an example of contents of a program for instructing transfer of pixel draw data or the like between the video chips V1–V4, or between the draw control chip 10 and the video chips V1–V4. There are three types of transfer of pixel draw data: transfer between the registers in the video chips V1–V4 (inter-internal register transfer), transfer between the video chips V1–V4 and the draw control chip 10 (data bus transfer), and transfer between the video chips V1–V4 and the video buffers APA1–APA4 (memory/bus transfer).

The four bits from bit 0 to bit 3 are bits for instructing the inter-internal register transfer, start-up of the pixel process PP which calculates data, and start of masking for the pixel draw data. For example, when it is assumed that RegY is a register for performing input/output to the video buffers APA1–APA4, RegX a register for transferring pixel draw data with the draw control chip 10, RegM (not shown) an input register for masking, RegN an output register, etc., the instructions for transfer of the pixel draw data between these registers are expressed as follows.

"0111": Transfer from the register RegY to the register RegX

"0011": Transfer from the register RegX to the register RegN

"0101": Transfer from the register RegN to the register RegY

"1110": Starting of pixel masking

"1111": Start-up of the pixel processor PP These merely are examples. Transfer between each register or the like may be appropriately defined by using these four bits.

The decoder DEC2 performs decoding based on the above definition, enables each of these registers, and transfers the pixel draw data. The sequencer SEQ starts the pixel processor PP or the masking processor.

Two bits, bit 4 and bit 5, indicate the data bus transfer. For example, the following may be defined for bit values.

"01": Transfer from the register RegX to the register RegX, or transfer between the video chip V1 and the video chip V4.

"10": Transfer from the register RegX to the draw control unit 10, and transfer from the video chips V1–V4 to the draw control unit 10

"11": Transfer from the draw control unit 10 to the register RegX, or transfer from the draw control chip 10 to the video chips V1–V4. In particular, the data transfer between the video chips V1–V4 can improve the transfer efficiency because data can be supplied to four video chips V1–V4 in one bus cycle, or data can be sequentially delivered between four video chips V1–V4.

Two bits, bits 6 and 7, indicate the data transfer of the pixel draw data between the video chips V1–V4 and the video buffers APA1–APA4. For example, the bit values may be defined as follows.

"01": Transfer from the register RegY to APA1–APA4, or writing of the pixel draw data in the video buffers APA1–APA4.

"10": Transfer from APA1–APA4 to the register RegY, or reading of the pixel draw data from the video buffers APA1–APA4.

Bits 8 to bit 9 indicate an address index, and indicate an ID of one to be enabled of four address registers, described later.

Bit A indicates whether or not the contents of the address register indicated by the address index should be incremented. For example, when it becomes "1", the contents of the address register are incremented by 1, and when it becomes "0", the contents of the address register are not changed.

The D-th bit is a short loop indicating the repetition of a program. When this bit is set to 1, the program is repeated by the specified number of times.

Figure 5:
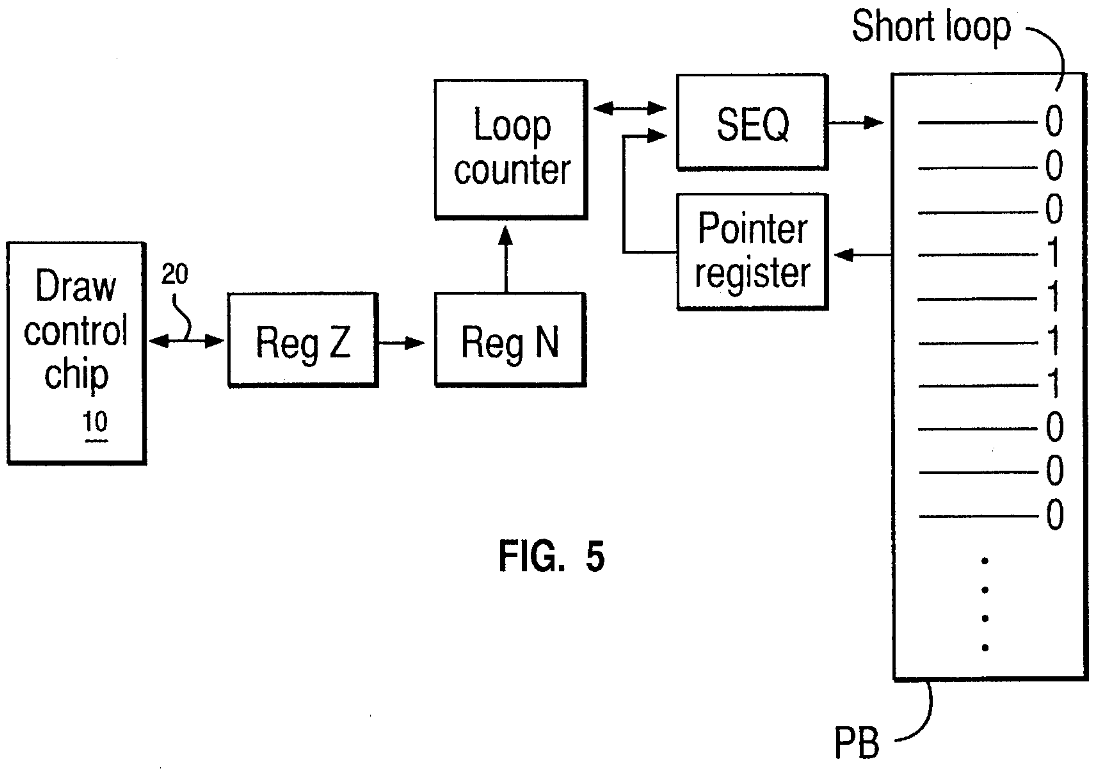
FIG. 5 is a diagram showing procedure of a short loop.

This short loop is now described. In FIG. 5, the draw control unit 10 specifies in the direct order the address of a loop counter which is a register for storing the number of times of repetition of the short loop, and stores in the direct data the number of times of repetition of the short loop in the register RegN. The sequencer SEQ stores the address of procedure in the program buffer PB which indicates the start of short loop in the pointer register, and stores the contents of the register RegN in the loop counter. The sequencer SEQ sequentially reads the operations of the program buffer PB which indicates the start of the short loop in the decoder DEC 2, and executes them. When the operation turning off the bit of the short loop is read, the contents of the loop counter is decremented by one, and the contents of a pointer register is read. The operations of the program buffer PB pointed by this pointer register are sequentially read, repeatedly executed, and continued for execution until the contents of the loop counter reaches zero.

Specification of this short loop allows predetermined operations to be repeatedly executed by a predetermined number of times so that programming can be easily attained and the memory capacity of the program buffers can be saved.

E-th bit is a bit indicating the end of operation. For example, if "1" is set, the sequencer SEQ terminates the execution of operation, and informs the ready signal line 24 of the ready state.

The F-th bit indicates which of the above-mentioned programs is used, that is, setting of the registers in the video chips V1–V4, or the transfer of the pixel draw data.

When the program in the above-mentioned program buffer PB is executed, it is necessary that the pixel draw data to be processed by the pixel processor PP and the value for addressing the address register be set. Although a method may be possible for directly performing writing into the registers in the video chips V1–V4 under the direct control from the draw control chip 10 in the direct mode, an example of a method performing it in the indirect mode is described in the following.

Figure 6:
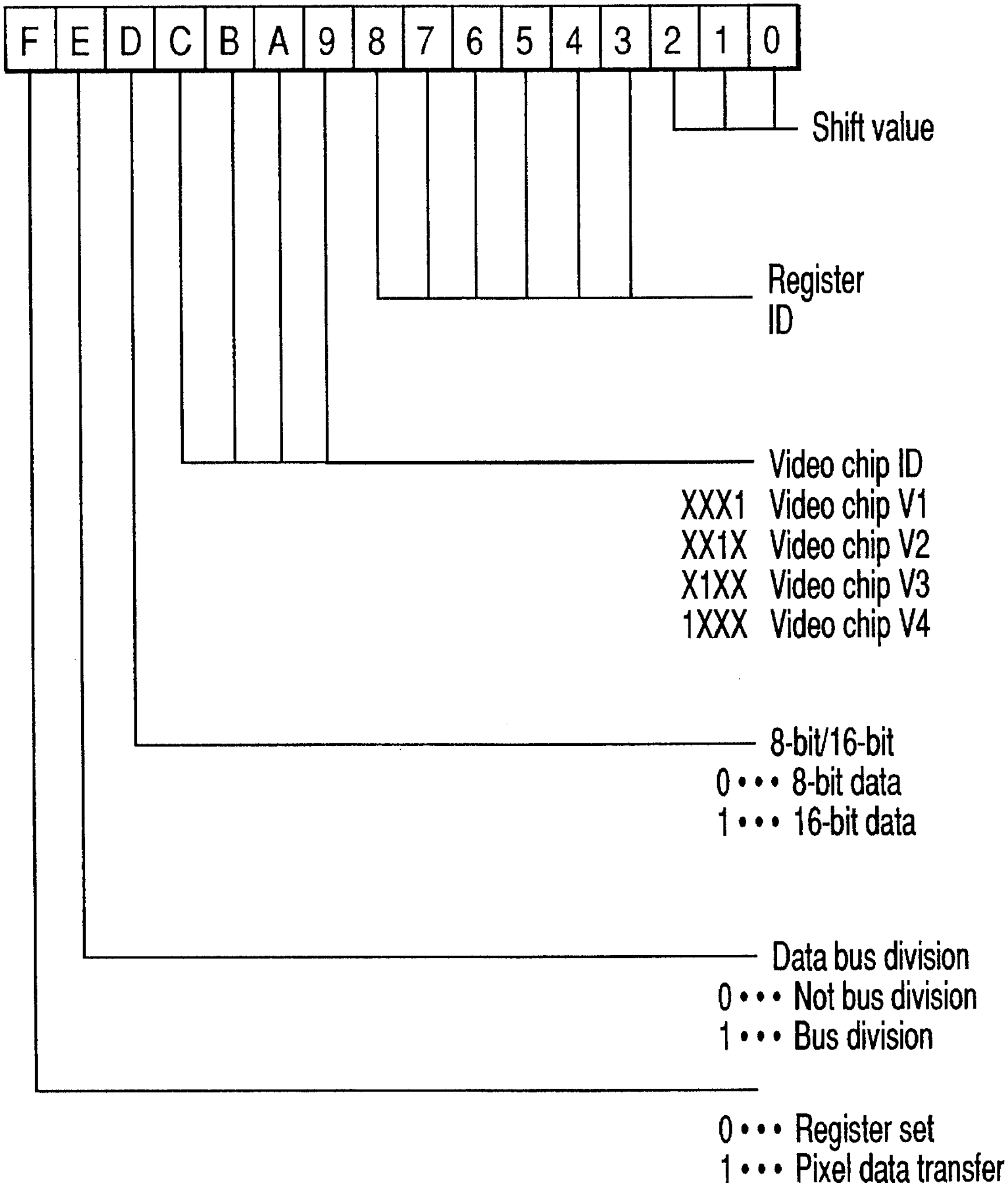
FIG. 6 is a diagram showing contents of a program for defining the transfer protocol of a data bus.

As shown in FIG. 6, the three bits from bit 0 to bit 2 indicate amount of shift of the pixel draw data stored in the register. When the E-th bit, described later, specifies the division of the data bus 22 into four, this specifies each of the video chips V1–V4 to receive a predetermined 16-bits of 64-bit data, and to store this 16-bits of data in a predetermined location in the registers (hereinafter called a "register file") indicated by a register ID, described later, such as the register RegX, the register RegY, or the address register by shifting the data by the amount of shift indicated by these bits.

The six bits from bit 3 to bit 8 indicate the register ID of a register file, and indicate a 64-bit wide address of an register file to be stored.

The four bits from bit 9 to bit C indicate the video ID of a video chip, and cause the one matching this video ID of the video chips V1–V4 to receive data in full 64-bit width when the division of the data bus 22, described later, is not specified. The D-th bit indicates whether the data is 8-bits or 6-bits. This allows it to write the data in every 8 bits or 16 bits into the register file.

The E-th bit specifies whether the data bus is used by dividing the data bus 20 into, e.g. four groups or in full width without dividing it. When the data bus 20 is divided into four, it is possible to shift 64-bit data by a predetermined amount with the video IDs which respective video chips V1–V4 uniquely have, to receive only a predetermined 16 bits, and to simultaneously set the pixel draw data or the like to respective video chips V1–V4. When the data bus 20 is not divided, a register value is stored in a register indicated by the register ID to a video chip indicated by the video ID.

The F-th bit indicates which of the above two types of programs should be used.

The operation of the above-mentioned program is described in the following. Data transferred through the program signal line 22 is decoded by the decoder DEC1, and to enable the program buffer address register PBAR pointed by the ID of the program buffer address register PBAR. The sequencer SEQ reads a 16-bit program from the program buffer PB pointed by the program buffer address register PBAR, and stores it in the register RegA. The decoder DEC2 reads and decodes the program stored in the register RegA, and enables the register specified by the program for the inter-register transfer, or for storage by a protocol for which the pixel draw data, a register value, or the like transferred by the data bus 20 is specified.

Figure 7:
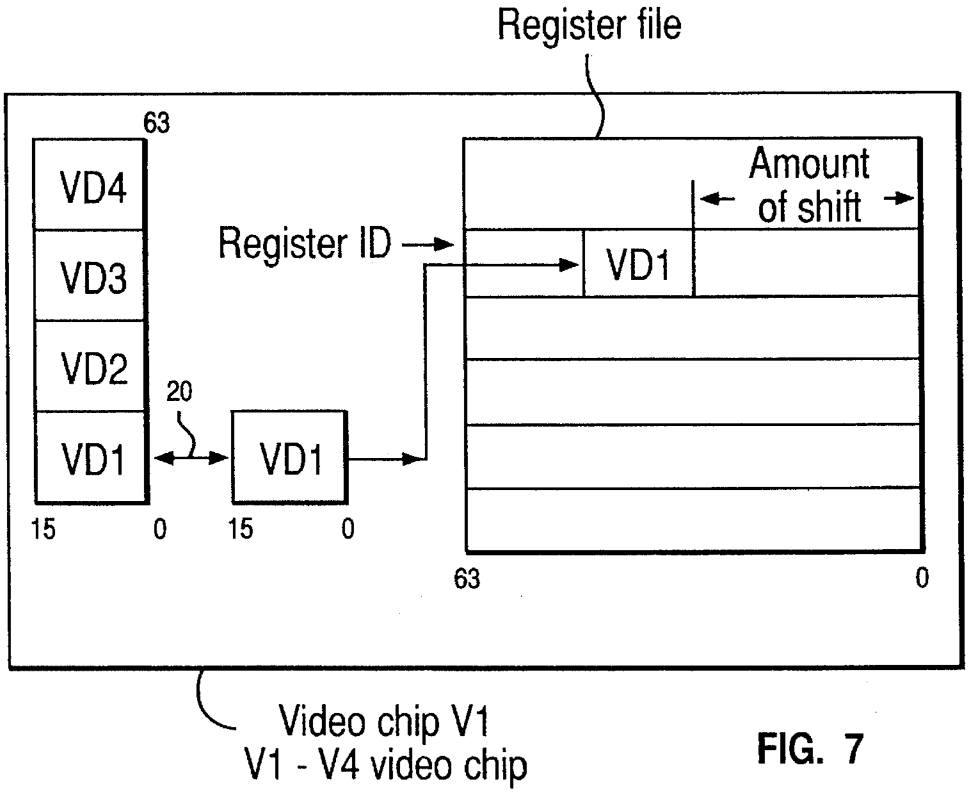
FIG 7 is a diagram showing storage of data in a register file based on the transfer protocol.

FIG. 7 shows the storage of data in the register when the protocol specified by the program is specified for division into four.

As shown in FIG. 7, each of the video chips V1–V4 stores 64-bit data VD1–VD4 from the data bus 20 in the 64-bit register RegZ. The data is shifted by a predetermined number of bits by a shift register, not shown, with the video ID, which the respective video chips V1–V4 uniquely have. The video chips V1–V4 transfer only either one of the 16-bit data VD1–VD4 to the register RegX. Furthermore, the data VD1 is shifted by the amount of shift specified by the shift register, not shown, and stored in the register file. This causes four-division, 16-bit data, for example, the pixel draw data to be stored in a predetermined register in every eight bits, and processing can be performed in each video chips V1–V4 in parallel by using this pixel draw data so that the processing efficiency can be improved.

Although this embodiment applies to the pixel draw data of eight bits per pixel, this invention is, of course, not limited to it, but may be applied to 16-bit, 4-bit or 2-bit pixel draw data as well.

Next, an operation to access the register in one of the video chips V1–V4 or one of the video buffers APA1–APA4 specified in the direct address is described. 64-bit data input in the order state by a bit value on the program signal line 22 is input to a decoder, not shown, and decoded to enable a specified address or the like. When an access to the video buffers APA1–APA4 is specified, an input/output buffer, not shown, and the address registers 1–4 are enabled to allow the access to the video buffers APA1–APA4.

When writing is specified, 64-bit data transferred through the data bus 20 is held by the register RegZ. Then, after predetermined masking is processed, the 64-bit data is stored in an enabled register or an input/output buffer, not shown. In the case of writing in the video buffers APA1–APA4, the pixel draw data stored in the input/output buffer, not shown, is written by the selector SEL in the video buffers APA1–APA4 having an address specified by the address registers 1–4.

Next, an operation to copy a predetermined area on the screen to another area, that is, so-called BITBLT operation is described.

Figure 8:
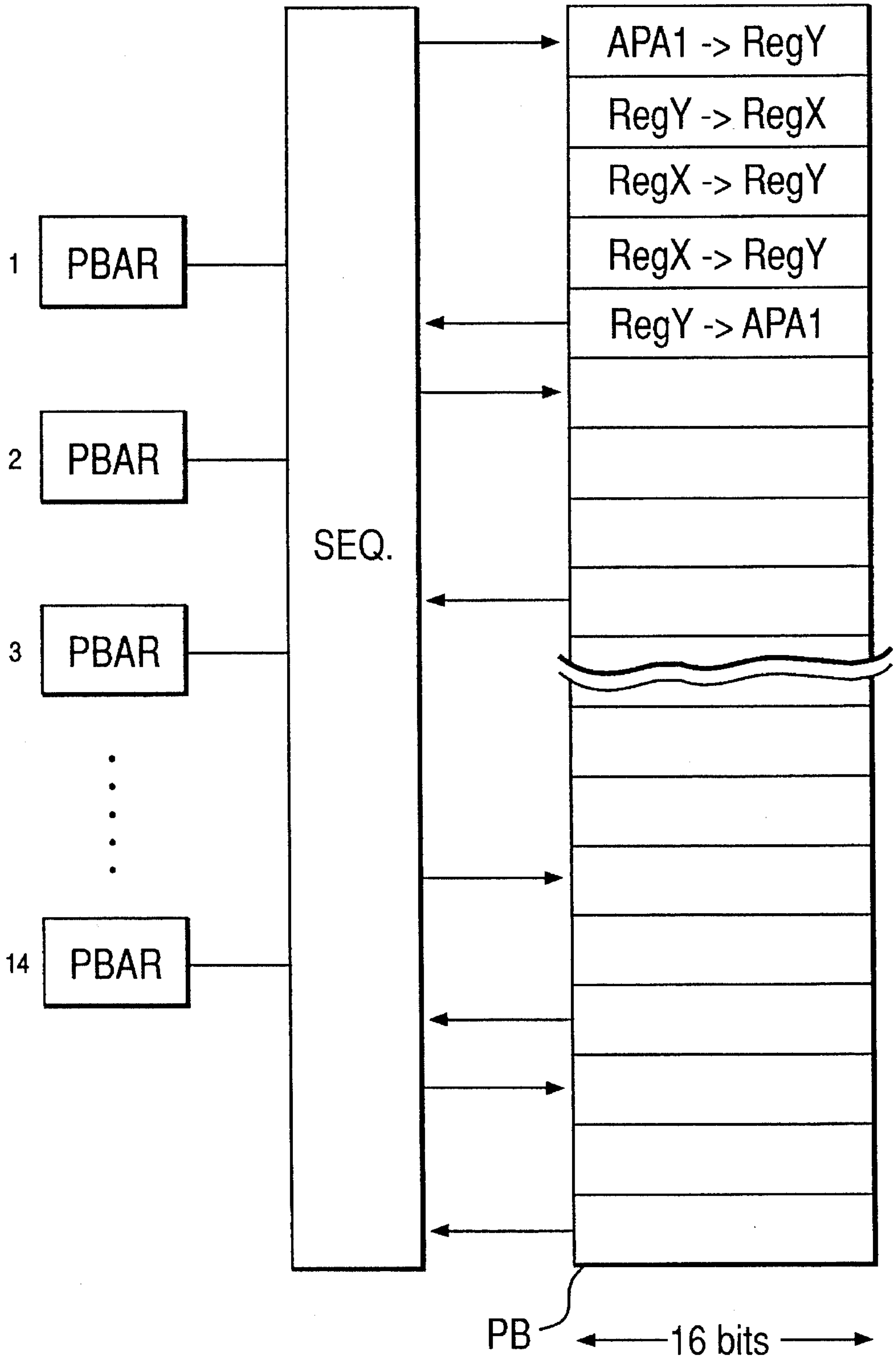
FIG. 8 is a diagram showing a program for BITBLT transfer.

First, an address value and a sequence of instructions are stored in the program buffer address register PBAR and the program buffer PB of the video chips V1–V4, respectively. The address value to be set in the program buffer address register PBAR and the sequence of instructions to be set in the program buffer PB are set from the draw control chip 10 through the 64-bit data bus 20. This sets the bit value of the program signal line 22 to zero to issue the order state, then specifies the write mode or the like to the address and the registers in the program address, to which it is intended to set the address value and the sequence of instructions, by transferring the 64-bit data through the data bus 20, further turns the bit value of the program signal line 22 to one, and finally writes in the direct status the register value through the 64-bit data bus 20, or a program for performing the BITBLT operation in the program buffer PB. For example, the top address of the program for performing the BITBLT operation is written in the first register of the program buffer address register PBAR, while a 16-bit program shown in FIG. 8 is stored in the program buffer PB in order to perform the BITBLT operation in the format shown in FIG. 4.

Furthermore, to move a rectangular area on the screen, the address of pixel data at the source (source address) and the address of pixel data at the destination (destination address) are set in the address registers 1–2.

The source address is stored in the address register 1, and the destination address is stored in the address register 2. In addition, the pixel data at the source and that at the destination are stored in a register, not shown.

Then, values are stored in the RegW for storing the rectangular width value for the pixel, and in the RegH for storing the rectangular height value for the pixel.

To store the values in these registers, it may be performed in the direct mode switching the bit value of the program signal line 22 between 0 and 1, or in the indirect mode.

Then, when the bit value of the program signal line 22 is turned to two, or when the first register of the program buffer address register PBAR is specified in the indirect mode, the decoder DEC1 decodes the bit value of 2 of the program signal line 22 to select the first program buffer address register PBAR. The sequencer SEQ reads the program in program buffer pointed by the first program buffer address register PBAR, and the decoder DEC2 decodes the instructions of this program. Because the top program indicating the BITBLT operation is stored in the first register of the first program buffer address register PBAR, the BITBLT operation is sequentially executed.

Because an instruction instructing transfer from the video buffer APA1 to the register RegY is stored in the first program buffer, this instruction is decoded, and the source pixel draw data indicated by the address register 1 is read in the register RegY.

Then, the transfer from the register RegY to the register RegX is performed. Thereafter, the transfer from the register RegX to the register RegX is performed. This transfer from the register RegX to the register RegX is described in the following. The transfer from the register RegX to the register RegX is to transfer the pixel data at the source to the handling video chips V1–V4 so as to move the pixel data from the source to the target because the BITBLT operation is to move the pixel data from the source to the destination, and, as described above, the pixels for the destination have been determined as being handled by the respective video chips V1–V4.

It is determined from the address of pixel draw data at the destination with a table, not shown, on which bit of the data bus 22 the pixel draw data exists. One of the video chips V1–V4 to be connected to the pixel draw data at the destination is found to receive 16-bit data to be handled by the handling one of video chips V1–V4, to shift it by a predetermined amount with a shift register, not shown, and to transfer it to the register RegX. Then, the data is transferred as pixel draw data at the destination to the respective video chips V1–V4 through the data bus 22.

Figure 9:
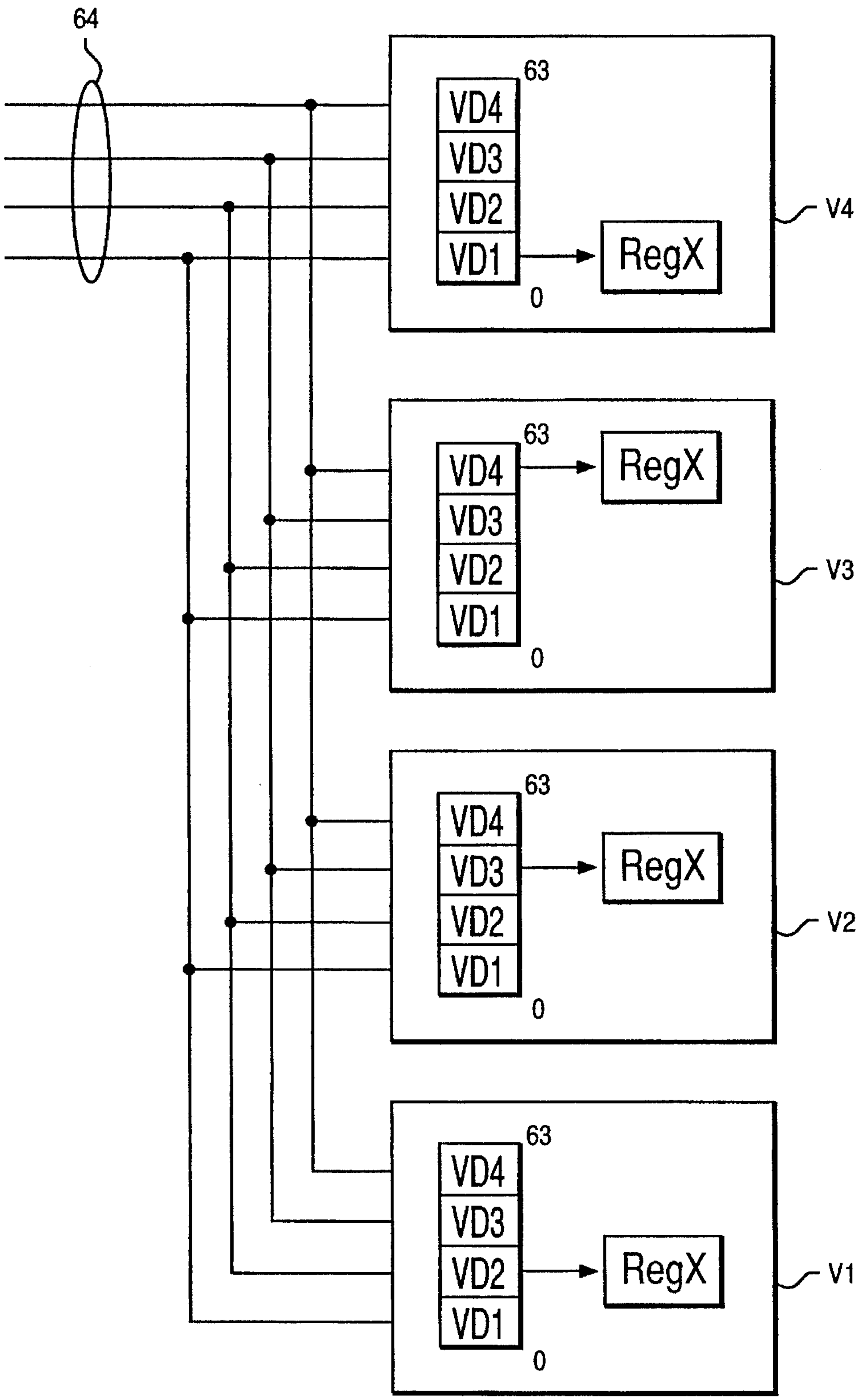
FIG. 9 is a diagram showing transfer between video chips V1–V4.

For example, FIG. 9 shows a case where, when the plane for the pixel draw data at the source exists in the video chip V1, the plane for the pixel draw data at its destination exists in the video chip V4, a case where, when the plane for the pixel draw data at the source exists in the video chip V2, the plane for the pixel draw data at its destination exists in the video chip V1, a case where, when the plane for the pixel draw data at the source exists in the video chip V3, the plane for the pixel draw data at its destination exists in the video chip V2, and a case where, when the plane for the pixel draw data at the source exists in the video chip V4, the plane for the pixel draw data at its destination exists in the video chip V3. As shown in FIG. 9, the pixel draw data is transferred and shifted to the planes for the pixel draw data at the destination on the video chips V1–V4 for parallel data transfer between the video chips V1–V4 through the data bus 22. That is, the transfer from the register RegX to the register RegX is data transfer to the video chip handling the pixel draw data at the destination, and also receipt of data from the video chip.

This allows 64 bits to be fully used through the bit data bus 22 so that the data can be transferred between the video chips without degrading the transfer efficiency.

Thus, the received pixel data in the register RegX is transferred between each video chips V1–V4 through the transfer from the register RegX to the register RegY. At the moment, the sequencer SEQ starts the pixel processor PP in the transfer path from the register RegX to the register RegY. The pixel processor PP processes the pixel draw data passing therethrough according to the instruction in a pixel processor, not shown.

Next, the instruction for the transfer from the register RegY to the video buffer APA1 is executed. This instruction is set with a value for switching the address register to the address register 2, which switches the specification of the address in the address register 2 to write the value at the position of target pixel in the video buffer APA1. At the moment, the address state bit shown in FIG. 4 in the instruction for the transfer from the register RegY to the video buffer APA1 is at one, which increments the respective address registers 1 and 2 to instruct the address for the next source and target. The pixel draw data passing therethrough is processed according to the instruction in the register.

In addition, the bit of the short loop is set in the program for BITBLT stored in the above-mentioned program buffer PB through the cooperation of the address control unit 54 and the sequencer SEQ. The contents of the register RegW is stored in the loop counter, and the loop is repeated by the number set in the loop counter. When it is completed, the value in the register RegH is decremented, and the contents of the register RegW is again set in the loop counter for repeating the processing. The processing is repeated until the value of the register RegH reaches zero to complete the BITBLT for the rectangular area.

Thus, the data transfer between the video chips V1–V4 can be executed without degrading the data transfer efficiency of the data bus 20. Therefore, even the BITBLT operation which requires frequent data transfer between the video chips V1–V4 can be executed without degrading the processing efficiency.

As described above, this invention is advantageous in that the data transfer operation can be controlled by selecting codes separately describing the bus control operation with a bit value of the signal line and the first register selected by this bit value. In addition, the data bus can be efficiently used simultaneously by the data transfer between the plurality of second registers with the control means. The processing efficiency can be improved because a predetermined second chip receives data of a predetermined number of bits for the data transferred through the data bus and processes the data in parallel. In addition, it is possible to save the first register for storing the codes for control operation and to easily program the codes for control operation because the decoding and the data transfer operation of the data bus are repeated predetermined number of times.

Although certain preferred embodiments have been shown and described it should be understood that many changes and modifications may be made therein without departing from the scope of the appended claims.

We claim:

1. A device for controlling data transfer between chips in a computer system, comprising:

a first chip;

a plurality of second chips;

a data bus having a predetermined bit width connecting said first chip and said plurality of second chips to transfer data between said first chip and said plurality of second chips;

a signal bus connecting said first chip and said plurality of second chips to transfer signals of predetermined bit values between said first chip and said plurality of second chips;

a plurality of first registers provided in each of said plurality of second chips, each of said first registers storing a code which controls data transfer operation of said data bus;

selecting means for selecting one of said first registers based on a bit value of a signal transferred by said signal bus; and control means for controlling the data transfer operation of said data bus based on said code stored in said first register selected by said selector means.

2. A device according to claim 1, further comprising a plurality of second registers provided respectively in each of said plurality of second chips, each of said second registers being assigned addresses based on the bit width of signals transferred by said signal bus and storing data addressable to each of said first registers.

3. A device according to claim 2 wherein said control means comprises means for controlling the data transfer operation of said data bus based on said code stored in said first register addressed by addressable data stored in the second register.

4. A device according to claim 3 further comprising means for sequentially accessing said plurality of first registers.

5. A device according to claim 4 wherein said control means further comprises means for controlling said second chips based on said codes stored in one of said first registers selected by said selecting means such that a predetermined second chip can transmit and receive data through said data bus.

6. A device according to claim 5 wherein said control means further comprises means for controlling the data transfer operation of said data bus by repeating, at predetermined times, processing based on said code stored in one of said first registers selected by said selecting means.

7. A device according to claim 6 wherein each of said plurality of second chips is a video chip performing write and read processing to a video buffer which stores draw data for at least one pixel.

8. A device according to claim 7, wherein the video buffer stores pixel draw data for drawing one-pixel in a memory connected in series by the video processing unit.

9. A system for transferring data between integrated circuit chips, comprising:

a data bus having a predetermined bit width interconnecting a first chip and a plurality of second chips;

a signal bus connecting said first chip and said plurality of said second chips to transfer signals of predetermined bit values from said first chip to said plurality of second chips;

means, in each of said plurality of second chips and responsive to a bit value of said predetermined bit values, for selecting one of a plurality of registers provided in each of said plurality of second chips, each of said plurality of registers storing a code; and control means for controlling data transfer operation of said data bus based on said code stored in each of said first registers.

10. A system according to claim 9 wherein said control means for transferring comprises means for transferring said data, having a bit width less than said predetermined bit width, directly between said plurality of second chips.

11. A system according to claim 10 further comprising means for dividing the predetermined bit width of said data bus into smaller bit width portions of data to be processed by said second chips.

12. A system according to claim 11 wherein said control means for transferring further comprises means for providing said smaller bit width portions of data from said first chip to each of said plurality of second chips simultaneously.

13. A system according to claim 12 wherein said control means for transferring further comprises means for providing said smaller bit width portions of data simultaneously between each of said plurality of second chips only.

14. A system according to claim 13 wherein plural smaller bit width portions of data are transferred simultaneously on said data bus.

15. A method of transferring data between integrated circuit chips, comprising:

interconnecting a first chip and a plurality of second chips with a data bus having a predetermined bit width;

connecting said first chip and said plurality of said second chips with a signal bus to transfer signals of predetermined bit values from said first chip to said plurality of second chips;

selecting one of a plurality of registers provided in each of said plurality of second chips by using a bit value of said predetermined bit values, each of said plurality of registers storing a code;

controlling data transfer operation of said data bus based on said code stored in each of said plurality of first registers.

16. A method according to claim 15 wherein said step of transferring comprises the step of transferring said data, having a bit width less than said predetermined bit width, directly between said plurality of second chips.

17. A method according to claim 16 further comprising the step of dividing the predetermined bit width of said data bus into smaller bit width portions of data to be processed by said second chips.

18. A method according to claim 17 wherein said step of transferring further comprises the step of providing said smaller bit width portions of data from said first chip to each of said plurality of second chips simultaneously.

19. A method according to claim 18 wherein said step of transferring further comprises the step of providing said smaller bit width portions of data simultaneously between each of said plurality of second chips only.

* * * * *

UNITED STATES PATENT AND TRADEMARK OFFICE

CERTIFICATE OF CORRECTION

PATENT NO. : 5,553,252

DATED : September 3, 1996

INVENTOR(S) : K. Takayanagi, et. al.

It is certified that error appears in the above-indentified patent and that said Letters Patent is hereby corrected as shown below:

Col. 5, line 49, delete "6-bit" insert --64-bit--;

Col. 14 line 13 delete "bit data" insert --64-bit data--;

and

Col. 13, line 33, delete "bus" insert --bus,--.

Signed and Sealed this

Eighth Day of April, 1997

Attest:

BRUCE LEHMAN

*Attesting Officer* *Commissioner of Patents and Trademarks*